Feb. 28, 1939.   P. J. NAGLE   2,148,492
VEHICLE TIRE CHAIN
Filed Aug. 22, 1936   3 Sheets-Sheet 1
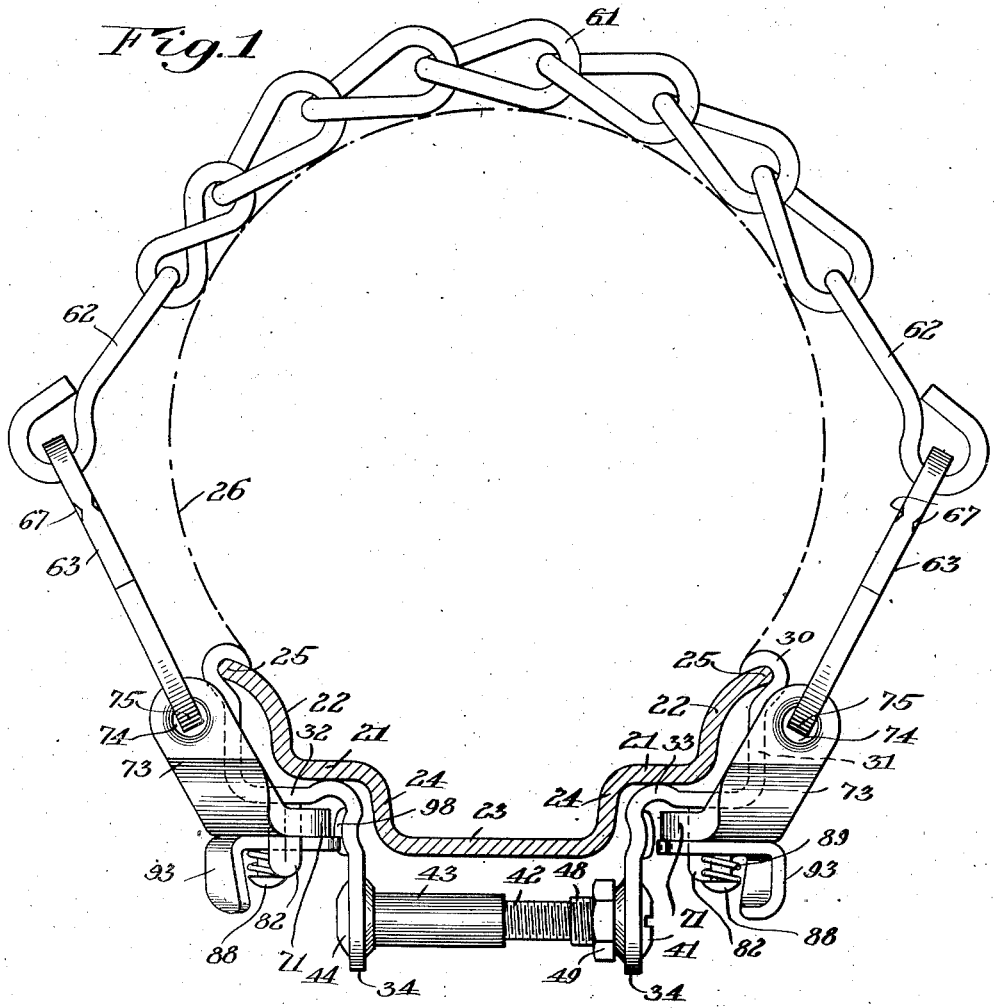
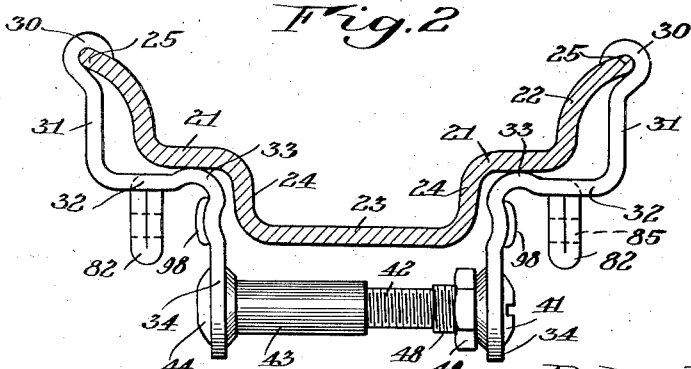
INVENTOR.
Peter J. Nagle
BY Cumpston & Shepard
his ATTORNEYS Feb. 28, 1939.   P. J. NAGLE   2,148,492
VEHICLE TIRE CHAIN
Filed Aug. 22, 1936   3 Sheets-Sheet 2
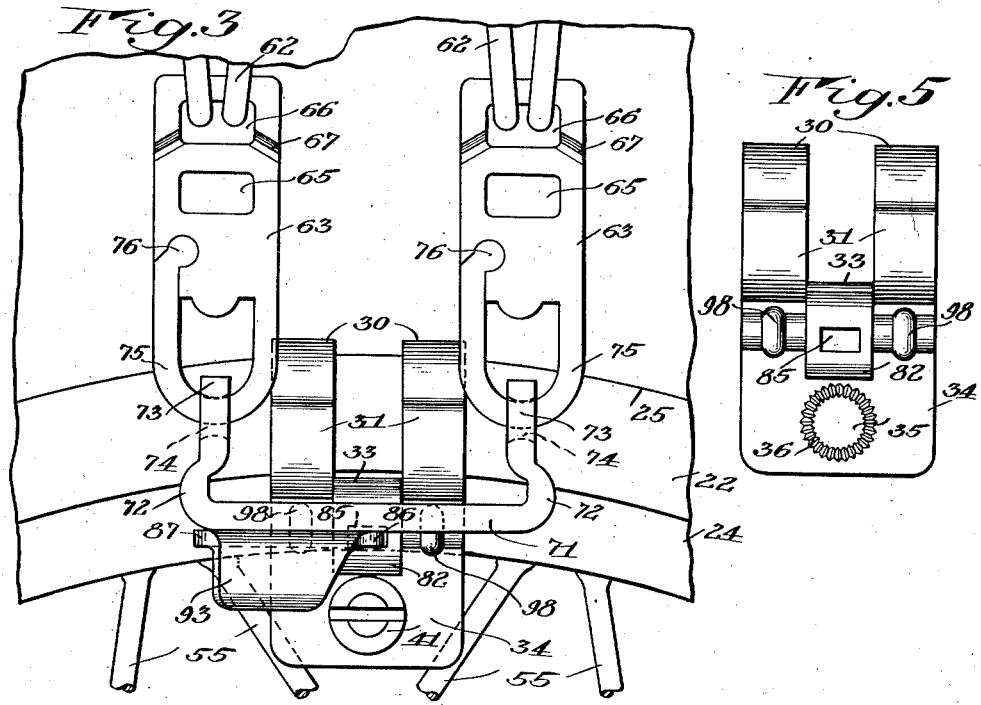
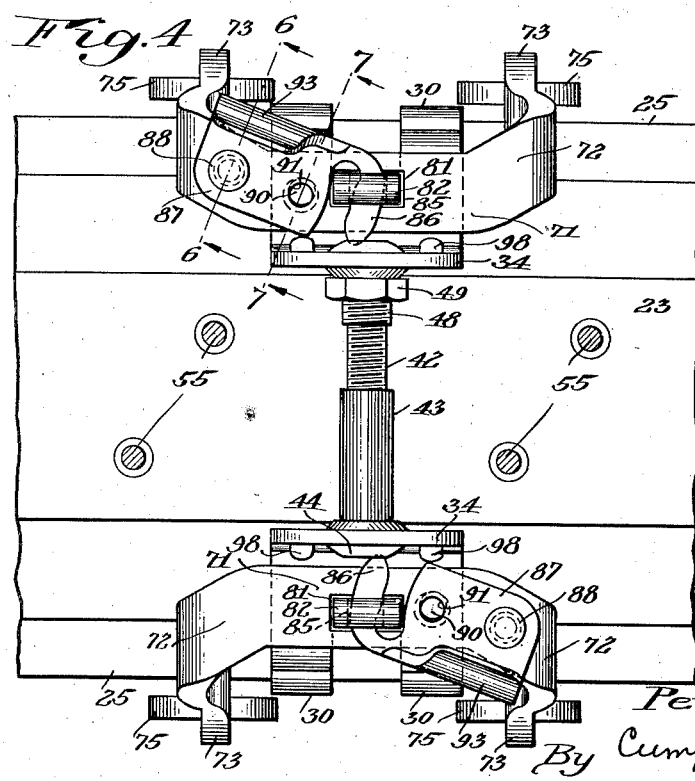
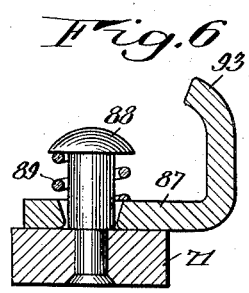
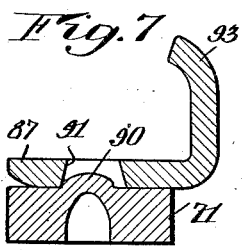
INVENTOR.
Peter J. Nagle
By Cumpston & Shepard
his ATTORNEYS Feb. 28, 1939.   P. J. NAGLE   2,148,492
VEHICLE TIRE CHAIN
Filed Aug. 22, 1936   3 Sheets-Sheet 3
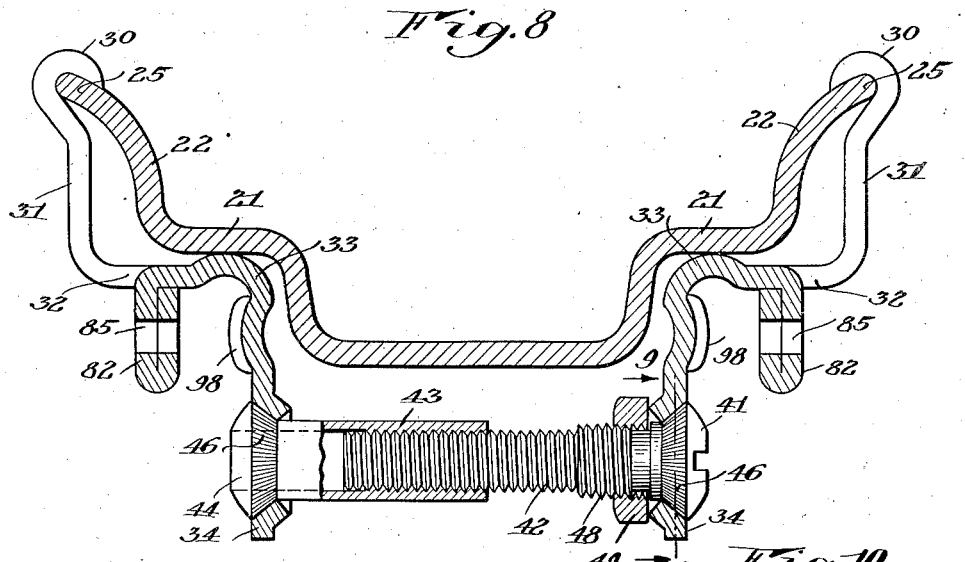
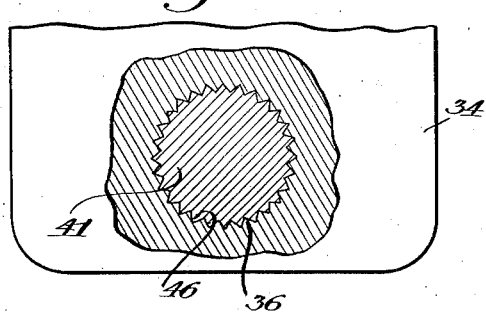
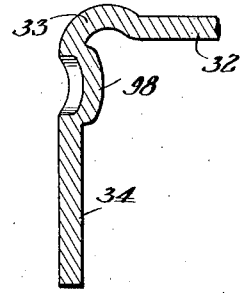
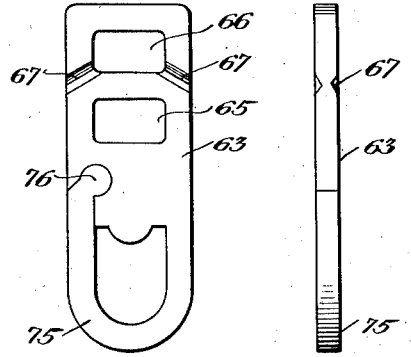
INVENTOR.
Peter J. Nagle
BY Cumpston + Shepard
his ATTORNEYS Patented Feb. 28, 1939

2,148,492

UNITED STATES PATENT OFFICE 2,148,492

VEHICLE TIRE CHAIN

Peter J. Nagle, Rochester, N. Y.

Application August 22, 1936, Serial No. 97,437

19 Claims. (Cl. 152—233)

This invention relates to tire chains for vehicles of various types, such as pleasure automobiles, trucks, busses, and the like.

It is generally conceded that snow, ice, and certain other road conditions make the use of tire chains on vehicles extremely desirable. Notwithstanding the manifest advantages of chains under certain conditions, there has been a considerable tendency in recent years to forego the use of chains even where they are badly needed. This is probably due to the fact that, with so many modern hard surfaced roads kept fairly free of snow during winter months, the road conditions making chains desirable usually last for only a few miles at a time. So much time and effort are required to place tire chains of existing types on the vehicle wheels, and to remove them therefrom, that many motorists are unwilling to spend the time and effort required to install chains when the chains may be needed only for a few minutes of driving and when they should then be removed to avoid rapid wear of the chains and tires, upon meeting different road conditions.

For example, a motorist may live a short distance, say a mile or two, along a side road from a main through highway. In the winter months, the main through highway may be kept clear of snow by the use of snow plows, but the side road may have a substantial amount of snow upon it. The ideal arrangement would be for the motorist to use chains on his automobile in driving from his home along the side road to the main road, and then to remove these chains when he reaches the main road, so that the chains will not be badly worn by driving along the main road, by contact with the clean, hard surface thereof. Yet few motorists are willing to take the time and trouble to put on chains for a short drive of this kind along the side road, even though snow and ice conditions along such a road might make the chains highly desirable.

An object of the present invention is the provision of a generally improved and more satisfactory tire chain construction, and more particularly the provision of a chain which can be applied to and removed from the vehicle wheel with very little effort and in an extremely short space of time, so that motorists equipped with the chains of the present invention will be encouraged to apply such chains to their wheels wherever road conditions make this desirable, even though the chains may be required only through an extremely short distance of driving.

Another object of the invention is the provision of such a tire chain construction particularly adapted to present day types of automobile wheels, most of the modern wheels being so constructed that many previously proposed kinds of tire chains cannot be applied to them.

Still another object is the provision of simple and effective clamping parts designed to be applied to vehicle wheels and to remain thereon more or less permanently, throughout the year or at least throughout the winter driving season, in combination with cross chain parts adapted to be attached quickly and easily to the clamping parts, and in combination also with simple and effective means for locking or latching the cross chain parts to the clamping parts.

A further object is the provision of locking or latching means for holding the cross chain parts in place, so constructed that the cross chain parts may be unlocked or unlatched with great ease and rapidity when desired, but cannot become accidentally disconnected.

A still further object of the invention is the provision of various improvements and refinements in various detailed features of the construction, making the present construction simpler and more satisfactory than prior tire chain constructions.

To these and other ends the invention resides in certain improvements and combinations of parts, all as will be hereinafter more fully described, the novel features being pointed out in the claims at the end of the specification.

In the drawings:

Fig. 1 is a diagrammatic radial section through a portion of a vehicle wheel rim and tire, showing a tire chain construction in accordance with a preferred embodiment of the invention applied to said rim and tire;

Fig. 2 is a similar view of the rim and of the clamping parts of the tire chain construction, with the cross chain parts removed therefrom;

Fig. 3 is a fragmentary side elevation of the parts shown in Fig. 1;

Fig. 4 is a plan of the parts shown in Fig. 1, viewed from the center of the wheel and looking outwardly toward the periphery thereof, the spokes being shown in cross section;

Fig. 5 is a side elevation of one of the clamping members, removed from the other parts;

Fig. 6 is a section taken substantially on the line 6—6 of Fig. 4;

Fig. 7 is a section taken substantially on the line 7—7 of Fig. 4;

Fig. 8 is a view similar to Fig. 2, on a larger scale, with parts of the clamping mechanism in section;

Fig. 9 is a section taken substantially on the line 9—9 of Fig. 8;

Fig. 10 is a fragmentary section through one of the clamping members, the section being in a plane parallel to the plane of the section in Fig. 8, but spaced therefrom;

Fig. 11 is a plan of one of the chain mounting bars, removed from the clamping parts, and with the chains detached from it;

Fig. 12 is a face view of one of the hanger links for connecting the cross chains to the mounting bar shown in Fig. 11, and Fig. 13 is an edge view of the hanger link shown in Fig. 12.

The same reference numerals throughout the several views indicate the same parts.

A preferred embodiment of the invention will now be described by way of example in connection with the accompanying drawings. The wheel rim in this example is of the so-called drop center type, now commonly used on many modern automobiles, and comprises, when viewed in radial cross section, what may be termed a wide channel section having a bottom 21 and sides 22, and a narrower channel section sunk into the bottom of the wide channel section approximately centrally thereof, the narrower channel having a bottom 23 and sides 24. The sides 22 of the wide or main channel section flare outwardly as indicated in Figs. 1, 2, and 8, and terminate in free edges 25. The tire indicated diagrammatically at 26, when seated properly on the rim, does not extend all the way to the free edges 25, but leaves the side walls 22 slightly inwardly from the edges 25 so that these edges 25 project somewhat outwardly away from the side wall of the tire, as shown.

The parts of the present invention which constitute the clamping unit are arranged to be applied to this arm and to remain thereon more or less permanently. These parts include two members, conveniently called hook members, which engage the two opposite sides of the rim, and connecting means for securing the two hook members to each other in such a way that they will remain tightly on the rim. The two hook members may, if desired, be identical duplicates of each other.

Each hook member, as best shown in Figs. 2, 5, and 8, comprises a strip of strong metal cut, bent, and formed to provide a hook portion 30 for engagement with the free edge 25 of the wheel rim. From the hook portion 30 the member extends approximately radially inwardly toward the rotary axis of the wheel for a short distance as at 31, then extends laterally toward the central plane of the wheel as at 32, and at the end of this portion 32 is provided preferably with a curved portion 33 for engaging the surface of the bottom portion 21 of the main channel section of the wheel rim. From the curved portion 33 the hook member again extends radially inwardly toward the rotary axis of the wheel, as at 34, to a point a substantial distance closer to the rotary axis of the wheel than the inner edge or bottom 23 of the rim. In this portion 34, which is a broad web of metal, is formed an aperture 35 (Fig. 5) having a beveled edge faced outwardly, and this edge is provided with a circumferential series of teeth 36 extending in a generally radial direction, or, more accurately, in the direction of elements of a cone corresponding to the conical or beveled surface of the hole 35.

Two of these hook members are applied to opposite edges of the rim at points directly opposite each other (that is, lying substantially in the same radial plane) and are connected to each other by connecting means passing through the holes 35. In the embodiment constituting the preferred example of the invention, the connecting means comprises a threaded bolt having a head 41 and a screw threaded shank 42 screwed into corresponding internal threads in a hollow sleeve 43 having a head 44. The bolt member 41—42 extends through the hole 35 in one of the two hook members (in the right hand hook member when viewed in Figs. 1, 2 and 8) while the sleeve member 43—44 extends through the hole 35 in the other of the two hook members (in the left hand hook member when viewed as in Figs. 1, 2, and 8). The bolt head 41 and sleeve head 44 are both beveled or formed frusto-conically on their inner shoulder surfaces to correspond to the frusto-conical bevel of the outer edges of the holes 35, and both of these heads 41 and 44 are provided with a circumferential series of sharp teeth 46 to engage with the corresponding teeth 36 around the edges of the hole 35. These teeth 36 and 46 preferably are of approximately triangular cross section, as indicated in Fig. 9, and are of sufficiently large size so that they will not be abraded off or worn smooth by a reasonable amount of turning of one part relatively to the other, when the device is being applied to or removed from the wheel rim.

The bolt may have, just under the head 41, a screw threaded portion 48 of slightly larger diameter than the shank 42, on which portion 48 is a nut 49 which may be screwed tight against the opposite side of the member 34 from that engaged by the head 41, in order to hold the parts more tightly and assist in preventing accidental displacement.

The metal of which the clamping members are made preferably has some slight amount of resilience, so that when a considerable amount of force is exerted on the inner ends 34 of the clamping members, these ends may be slightly sprung toward each other. With this construction, the bolt 42 can be tightened, as by means of a screw driver applied to a slot in the head 41, until the ends 34 of the clamping members are sprung slightly toward each other, thus placing the parts under the desired tension. As the bolt head 41 turns relatively to the part 34, and the teeth 46 slip over the teeth 36, the parts 34 will be drawn slightly toward each other each time that the end of a tooth 46 slips over a tooth 36, and then as each tooth 46 enters the interdental space between the teeth 36, this will very slightly release the parts and enable the portions 34 to swing back a slight distance away from each other. The tightening should be continued until there is a reasonable degree of tension on the bolt when the teeth 46 and 36 are interengaged with each other as shown in Fig. 9. Then, the resilience of the hook members will constantly tend to move the portions 34 away from each other, exerting a constant tension on the bolt and keeping the teeth 46 on the heads 41 and 44 engaged firmly with the teeth 36 on the parts 34. With this tension arrangement, and with the interengaging teeth on the parts, no amount of ordinary jarring or vibration can cause either the bolt member or the sleeve member to turn relatively to its part 34, so that the parts remain firmly locked as long as desired, and can only be removed upon the application, by a screw driver or wrench, of sufficient force to swing the parts 34 further inwardly toward each other and permit the teeth 46 on the bolt head 41 to slip over the teeth 36 on the member 34.

With this construction, the means connecting the two parts 34 of the two hook members of the clamping unit is entirely a tension means, never exerting any compression or any tendency to separate the two members 34 from each other. Because the connecting means is always under tension, never under compression, it may be made of relatively small cross sectional dimensions, so that this connecting means may pass easily between the relatively small spaces left between the spokes 55 of modern wheels. In fact, the bolt and sleeve may be made so small that they will easily pass through small holes formed through the disks of wheels of the disk type, thus enabling the present clamping unit to be applied to such wheels, and to wheels with wire spokes spaced closely together, whereas prior clamping arrangements are not adapted for engagement with such wheels, but require relatively large spaces through the wheel for passage of the necessary parts.

When the tension of the bolt 42 and sleeve 43 tends to pull the inner ends 34 of the hook members inwardly toward each other (that is, toward the central plane of the wheel), this causes the portions 33 to bear against the under surface of the bottom portions 21 of the wide or main channel section of the rim, while the hooks 30 pull on and firmly grip the free edges 25 of the rim. The hooks extend around the edge of the rim far enough to resist the force tending to displace them. For instance, the pull on the portion 34 toward the central plane of the wheel will tend somewhat to pivot the entire hook member about the portion 33 as a fulcrum, and will tend to swing the hook 30 outwardly away from the edge 25 of the rim, on an arc having, as its center, the point of contact between the portion 33 and the rim portion 21. But the hook portion 30 is shaped to extend far enough around the free edge of the rim 25, as illustrated in the drawings, to resist such outward swinging tendency and to remain firmly engaged with the rim under the influence of the various forces produced by tightening the bolt 42. It will be seen also from the drawings that the hook portion 30 of each hook member extends around the free edge 25 of the wheel rim far enough to resist easily any tendency of the tension means 42—43 to pull the whole hook member laterally inwardly toward the central plane of the wheel, sliding the portion 33 over the surface of the rim.

These clamping parts, that is, two of the hook members together with one connecting means (bolt 42 and sleeve 43), can be applied reasonably quickly to modern present day wheel rims of many different sizes and styles, most of which are constructed in the general manner illustrated in the drawings, irrespective of the size and irrespective of the type of spokes or wheel center employed. If the wheel has wire spokes as shown at 55, the connecting means 42—43, being of small cross section, will extend easily through the central plane of the wheel, through the small spaces between the spokes, while the portions 34 of the two hook members will lie each to one side of the central plane of the wheel, far enough away therefrom to be clear of the spokes. If the clamping parts are applied to a wheel of the type having an imperforate disk extending from the hub almost to the rim, and then having a series of small scallop shaped or semi-circular shaped openings through the disk where it meets the rim, then the connecting means 42—43 is nevertheless small enough to extend through one of these small openings just inside the rim. If it is desired to apply these clamping parts to a wheel of the true disk type, having an imperforate disk extending all the way to the rim, then it is a comparatively easy matter to drill a small hole through the sheet metal of the disk in the proper position so that the connecting means 42—43 may be passed through the hole.

Preferably, but not necessarily, two or three of these clamping units are applied to each wheel, spaced more or less evenly around the periphery thereof. The clamping units may be applied to the wheels of the automobile when the automobile is purchased or soon after its purchase, and may be allowed to remain permanently thereon throughout the life of the automobile, if desired. If the owner should prefer not to drive with these clamping units on the wheel during the summer season when tire chains are seldom required, they may be applied in the fall and removed again in the spring. Of course they may be applied and removed again from day to day as required, since it takes only a few moments to apply each clamping unit, but in order to obtain the maximum benefit from the present invention, it is desirable to leave the clamping units in place at least throughout the winter driving season, because the cross chain parts or units can be applied to and removed from the clamping parts or units much more quickly than the clamping parts or units themselves can be applied to or removed from the wheel.

It is also seen that these clamping units are applicable, not only to various different styles of vehicle wheels, but also to various different sizes of wheels. The width of the wheel rim, that is the distance from one free edge 25 to the opposite free edge 25, may vary to a considerable extent without requiring the use of different clamping parts, because of the range of adjustment provided by the long screw threads on the shank 42 and the sleeve 43. For sizes of rims too wide or too narrow for the range of the usual connecting means 42—43, special long or short bolts and sleeves may be provided without having to provide different hook members. Of course, where other dimensions of the wheel rim differ to a great extent, different size hook members may also be provided for use on the different wheels.

The parts constituting the cross chain unit attachable to and detachable from the clamping unit comprise one or more cross chains to extend partially around the wheel tire from one side wall to the opposite side wall thereof across the tread portion of the tire. Preferably at least two cross chains are employed in each cross chain unit attached to one clamping unit.

The words "chain" and "cross chain" as used in this application are intended to be interpreted in a broad generic sense, so as to include any flexible elements, of any material (e. g., rubber strips), extending across the tread portion of the tire to aid traction and reduce skidding. The words are not intended to be limited to an element made up of a series of links. In the illustrative form shown by way of example, each cross chain unit includes two chains which may be of standard metallic cross chain construction, formed of metallic links 61 of the usual twisted kind, joined together to constitute a short length of chain having hook members 62 at each end.

Each of these hook members 62 is hooked through an opening in a hanger link 63, the hook member being closed after insertion through the opening in the hanger link, as indicated in Fig. 1, so that it cannot become accidentally detached therefrom. Each hanger link preferably has two or more openings for receiving the hook members 62, two such openings being indicated at 65 and 66 in Fig. 12. The hanger link is provided with grooves 67 extending part way through the body of the metal of which the hanger link is made, from the inner corner of the outer opening 66 obliquely outwardly to the side edges of the hanger link, as indicated in Figs. 12 and 13. These grooves 67 provide weakened lines so that, by means of a sharp blow from a hammer, the outer end of the hanger link can be readily broken off along these weakened lines 67. For use on tires of relatively large size, the standard length of cross chain can be employed, and the hooks 62 thereof can be hooked into the outermost opening 66 of the hanger link. The same standard length of cross chain can also be employed on tires of smaller size by breaking off the end of the hanger link along the lines 67, and by hooking the hooks 62 in the second opening 65 of the hanger link. As many hook receiving openings and weakened breaking lines may be provided in the hanger links as desired.

Two mounting bars 71 are provided, one for detachable connection with each hook member of the clamping unit. Each mounting bar 71 is connected to the desired number of hanger links 63, depending upon the number of cross chains desired in the cross chain unit. Since two cross chains are used in the illustrative embodiment, two hanger links are to be connected to each mounting bar 71 in this embodiment. The mounting bar 71 is made of a bar of metal of rectangular cross section, having an approximately straight central portion, beyond which, at each end, the mounting bar is bent slightly in its own plane as at 72, and then bent approximately at a right angle to the plane of its central portion, to extend obliquely outwardly near the side of the wheel rim in a general direction away from the rotary axis of the wheel and also away from the central plane of the wheel, as indicated at 73 in Fig. 1. The extreme end of this portion 73 is provided with an aperture 74 through which is engaged a loop portion 75 at one end of the hanger link 63, which loop portion 75 may be a piece of metal integral with the main body of the hanger link 63, and bent around as shown in Fig. 12, the extreme end of the loop portion 75 having an enlargement 76 fitting tightly in and interlocking with a corresponding opening in the main body portion of the link 63.

In order to secure each mounting bar 71 to the clamping unit, each mounting bar is provided near its center with an aperture 81 adapted to receive a lug portion 82 on one of the hook members of the clamping unit. This lug portion 82 may conveniently be formed by cutting a strip of the metal of which the hook member is formed, inwardly from the extreme hook end 30 thereof, down through the portion 31 and along the portion 32 to the point where the lug 82 is to be located. The strip thus cut from the hook member may be approximately one-third of the width of the hook member, and may be cut centrally thereof, as indicated plainly in Fig. 5, so that the cut-out portion divides the outer end of the hook member into two separate portions as shown in Figs. 3, 4 and 5, forming in effect a bifurcated outer end having two hooks 30 for engaging the edge 26 of the rim at a slight distance from each other, as shown. The strip of metal cut from the center of the outer end of the hook portion is doubled back sharply upon itself, as indicated in Fig. 8, to form a substantial and rigid lug 82, of double the thickness of the metal of which the hook member is made, extending radially inwardly toward the center of the wheel from about the middle of the portion 32 of the hook member.

When the mounting bar 71 is applied to the hook member so that the lug 82 extends through the opening 81, it is seen that the lug will firmly hold the mounting bar 71 and resist movement thereof in any direction except radially inwardly toward the rotary axis of the wheel. Thus the pull exerted on the cross chains by centrifugal force during travel of the vehicle, being a pull in a radial outward direction, will be adequately resisted by the lug 82 and any tendency of the cross chain to move circumferentially or peripherally around the wheel, as when the brakes of the vehicle are applied hard, will also be resisted by the lug 82.

Suitable locking or latching means is provided to hold the mounting bar 71 on the lug 82 and prevent accidental disengagement therefrom in a radial inward direction. This latching means preferably comprises a hole 85 formed through the lug 82 for cooperation with the end 86 of a latch member 87 pivoted to the bar 71 by means of a riveted stud 88. This stud 88 (see Fig. 6) is considerably longer than the thickness of the latch member 87, and is surrounded by a small coiled spring 89 which presses against the member 87 to tend constantly to hold the member 87 flat against the flat surface of the bar 71.

At a point between the pivot 88 and the hole 81, the bar 71 is provided with a slight upstanding projection or bump 90 (see Fig. 7) conveniently formed by punching a cavity in the opposite side of the bar 71, so as to force some of the metal thereof upwardly to form the desired bump. The latch member 87 has a hole 91 in the proper position to overlie and receive this bump 90, as shown in Figs. 4 and 7, when the portion 86 of the latch member is in position to extend through the hole 85 in the lug 82. Because of the spring 89 constantly tending to hold the latch member 87 flat against the bar 71, the latch member will be resiliently engaged with this bump 90 and will thus be prevented from turning accidentally around its pivot 88 so as to withdraw the portion 86 from the hole 85. But by grasping an upstanding flange 93 on the member 87, one may manually lift the latch member 87 a slight distance up from the surface of the bar 71, against the force of the spring 89, so as to disengage the hole 91 from the bump 90, and then the latch member 87 may be swung sideways, around its pivot 88, to withdraw the point 86 from the hole 85 in the lug 82, in order to unlatch the bar 71 from the lug and permit removal of the cross chain unit from the clamping unit. The same latching mechanism above described is duplicated on each of the two mounting bars 71 at the two ends of the cross chain unit.

It is seen that when the mounting bar 71 is engaged over the lug 82, and when the portion 86 of the latch 87 is inserted through the hole 85 in the lug 82, the mounting bar 71 will then be firmly latched to the clamping unit and all possibility of accidental disengagement therefrom will be prevented, although it may be disengaged in an instant when desired. It is also to be noted that the stresses produced in the parts during actual operation do not fall upon the latch and thus do not strain the relatively small and comparatively weak parts of the latch. The latch need resist only the comparatively slight force of gravity, jolts, jars and the like which might tend to move the mounting bar 71 radially inwardly off the end of the lug 82. The latch can be quickly operated so that it is but the work of a moment to apply both ends of the cross chain unit to the respective lugs 82 on opposite sides of the clamping unit, or to remove them therefrom. Indeed, this may be done so quickly and easily that there is little or no excuse for a motorist failing to apply chains or remove them as driving conditions require. The cross chains 61 and hanger links 63 will, of course, be of such size with relation to the size of the tire and rim, as to permit enough slack so that the mounting bar 71 may easily be moved onto and off of the innermost end of the lug 82. When the wheel comes to rest with the cross chain unit approximately at the top of the wheel, in the position indicated in Fig. 1, then gravity, in view of the slack necessarily present in this construction, will usually cause the hanger link 63 to fall outwardly away from the sides of the tire, as shown in Fig. 1. When the wheel is rotating centrifugal force will tend to pull the chain 61 radially outwardly away from the tread of the tire as far as possible, and under these conditions the hanger links 63 will be in contact with the side walls of the tire instead of being spaced laterally away from them as shown in Fig. 1. The hanger link 63, being in the form of broad flap strips, will have a firm bearing against the side walls of the tire, and thus will not chafe or mar the side walls, being superior in this respect to chain links.

Preferably the portions 34 of the hook members of the clamping unit are provided with small projections 98 at points opposite the edges of the mounting bars 71, coming almost into contact with the edges of the bars in the normal position thereof as shown in Fig. 4. Thus the edges of the bars will easily clear the bolt and sleeve heads 41 and 44, when the bars are placed on and removed from the lugs 82, and yet the bars 71 will derive some measure of lateral support from the projections 98. If one or another of the outer ends 73 of the bar 71 should accidentally come into contact with a curb, or with a large stone in the road, which might tend to twist the bar 71 around the lug 82 as a pivot, such twisting movement would quickly bring the edge of the bar 71 into contact with one or the other of the two projections 98 near opposite edges of the width of the part 34, and this contact would resist further twisting movement. These projections 98 also serve to protect the lug 82 from being bent or damaged by any force tending to move the whole bar 71 straight laterally toward the central plane of the wheel.

The projections 98 may be conveniently formed, like the projections 90, by pressing the metal of the member 34 from the opposite side, as shown in Fig. 10, forming a cavity on one side of the member 34 and causing the desired projection on the other side.

The pull of the cross chains 61 on the mounting bars 71 during normal use will tend to swing the outer ends 73 of these bars inwardly toward the central plane of the wheel, as well as tending to pull the mounting bars radially outwardly away from the axis of rotation of the wheel. The radially outward pull on the bars 71 will seat the bars more firmly upon the seating portions 32 of the clamping members and will cause the portions 33 of the clamping members to press more firmly against the wheel rim. The swinging or torsional movement of the mounting bars 71 will tend to cause corresponding swinging movement of the clamping members, because the holes 81 in the mounting bars fit fairly snugly over the lugs 82 on the clamping members so that there is not much play between the parts. The inward swinging of the outer ends of the clamping members will thus cause the outer hook-like portions 30 of these members to press more firmly against the outer edges 25 of the wheel rim. Thus the stresses produced in the parts by the pull of the chains will tend to engage the clamping members still more firmly with the rim, instead of tending to disengage the clamping members from the rim, as is the case with many prior clamping arrangements.

It is now seen that a simple and effective vehicle tire chain has been provided which has great flexibility with respect to conditions of use and which admirably fulfills all of the objects of the invention above set forth. Any desired number of the clamping and chain units may be applied to each vehicle wheel, and the chains may be used as long a time or as short a time as desired, with a minimum of effort in applying and removing chains.

The construction forming the subject matter of this present application is in the nature of an improvement upon the construction disclosed in the copending application of Peter J. Nagle and Walter J. Englert, Serial No. 8,528, filed February 27, 1935, for Tire chain, and in the copending application of Peter J. Nagle, Serial No. 52,862, filed December 4, 1935, for Tire chain construction. Certain subject matter disclosed but not claimed in this present application is claimed in the first of said copending applications, and the present application is a continuation in part of said second mentioned co-pending application, Serial No. 52,862.

While one embodiment of the invention has been disclosed, it is to be understood that the inventive idea may be carried out in a number of ways. This application is therefore not to be limited to the precise details described, but is intended to cover all variations and modifications thereof falling within the spirit of the invention or the scope of the appended claims.

I claim:

1. A tire chain construction for application to a vehicle wheel tire and rim, comprising clamping means for attachment to the wheel rim, said clamping means including on each side of the central plane of the wheel a portion projecting in a general direction toward the rotary axis of the wheel, and cross chain means for extending across the tread portion of the tire, said cross chain means including adjacent each end thereof a member having an aperture for receiving one of said projecting portions of said clamping means so that said member may be impaled thereon, and pivoted latching means for releasably latching said cross chain member to said projecting portion of said clamping means.

2. A tire chain construction for application to a vehicle wheel tire and rim, comprising clamping means for attachment to the wheel rim, said clamping means including on each side of the central plane of the wheel a portion projecting in a general direction toward the rotary axis of the wheel, each of said projecting portions having an aperture therein, and cross chain means for extending across the tread portion of the tire, said cross chain means including adjacent each end thereof a member having an aperture for receiving one of said projecting portions of said clamping means so that said member may be impaled thereon, and pivoted latching means mounted on each said members for releasably engaging said aperture in said projecting portion on which the member is impaled, to hold each of said members releasably on its associated projecting portion.

3. The combination with a clamping unit for application to a vehicle wheel rim, of a tire chain unit readily attachable to and detachable from said clamping unit, one of said units including a member having an aperture and the other of said units including a projecting portion extending through said aperture when said two units are attached to each other, cooperating seating surfaces on said two units for contact with each other to resist forces tending to move said tire chain unit radially outwardly with respect to said clamping unit, and pivoted latch means cooperating with said projecting portion to lock said apertured member against removal from said projecting portion by movement in a direction separating said seating surfaces from each other, when said latch means is in effective latching position.

4. The combination with a clamping unit for application to a vehicle wheel rim, of a tire chain unit readily attachable to and detachable from said clamping unit, one of said units including a member having an aperture and the other of said units including a projecting portion extending through said aperture when said two units are attached to each other, said projecting portion having an opening therein, and a latch member pivotally mounted on said apertured member and having a part positioned to enter said opening in said projecting portion when said latch member is in effective latching position, to lock said apertured member against removal from said projecting portion.

5. The combination with a clamping unit for application to a vehicle wheel rim, of a tire chain unit readily attachable to and detachable from said clamping unit, one of said units including a member having an aperture and the other of said units including a projecting portion extending through said aperture when said two units are attached to each other, said projecting portion having an opening therein, a latch member pivotally mounted on said apertured member and having a part positioned to enter said opening in said projecting portion when said latch member is in effective latching position, to lock said apertured member against removal from said projecting portion, and resilient means tending to resist displacement of said latch member from its effective latching position.

6. Mechanism for detachably securing one member of a clamping unit for application to a vehicle wheel rim to one member of a tire chain unit for application to a tire mounted on said wheel rim, said securing mechanism comprising means forming an aperture in one of said members, a projecting portion on the other of said members for extending through said aperture when said two units are attached to each other, and latch means pivoted to said apertured member for engaging said projecting portion when said latch means is in effective latching position, to prevent removal of said apertured member from said projecting portion.

7. Mechanism for detachably securing one member of a clamping unit for application to a vehicle wheel rim to one member of a tire chain unit for application to a tire mounted on said wheel rim, said securing mechanism comprising means forming an aperture in one of said members, a projecting portion on the other of said members for extending through said aperture when said two units are attached to each other, pivoted latch means mounted on one of said members for engaging the other of said members to hold said two members in attached relationship to each other, and abutment means on said member having said projecting portion for engaging said apertured member at spaced points a substantial distance from said projecting portion, to prevent substantial oscillation of said apertured member about said projecting portion as an axis.

8. As a new article of manufacture, a tire chain unit adapted for quick attachment to and detachment from a clamping unit secured to a vehicle wheel rim, said tire chain unit including a mounting bar elongated in a direction circumferentially of the wheel rim when said tire chain unit is attached to said clamping unit, said bar having an eye adjacent each end of said bar, two chain sections adapted to extend across the tread of a tire mounted on said rim, means connecting one end of each of said chain sections to one of said eyes, said bar also having an aperture adjacent its center through which a lug on said clamping unit may extend, and a latch pivoted to said bar for oscillation about a pivotal axis spaced from said aperture, said latch having a portion adapted to swing across said aperture to engage a lug extending through said aperture.

9. As a new article of manufacture, a tire chain unit adapted for quick attachment to and detachment from a clamping unit secured to a vehicle wheel rim, said tire chain unit including a mounting bar elongated in a direction circumferentially of the wheel rim when said tire chain unit is attached to said clamping unit, said bar having an eye adjacent each end of said bar, two chain sections adapted to extend across the tread of a tire mounted on said rim, means connecting one end of each of said chain sections to one of said eyes, said bar also having an aperture adjacent its center through which a lug on said clamping unit may extend, a pivot on said bar at a point spaced from said aperture, a protuberance on said bar at a point spaced from said pivot, a latch mounted on said pivot to swing about said pivot as an axis, said latch having a portion adapted to extend across said aperture to engage a lug extending through said aperture and also having a cavity for receiving said protuberance, and a coiled spring surrounding said pivot and pressing against said latch to tend to hold said latch flat against said bar so that said protuberance engaging said cavity will tend to prevent said latch from oscillating about said pivot.

10. The combination with a vehicle wheel rim having two lugs associated therewith and each extending in a general direction radially inwardly toward the axis of rotation of the wheel rim, each lug having a recess, of a vehicle tire chain unit for quick application to and removal from said rim, said unit including two apertured members each of which may be placed over and impaled on one of said lugs, latch means pivotally mounted on each of said apertured members and having a part arranged to enter the recess of the lug on which the associated apertured member is impaled to resist displacement of said apertured member from said lug, and flexible tread element means operatively connected to both of said apertured members and so arranged that when both of said members are impaled on their respective lugs, said flexible tread element means may extend across the tread of a tire mounted on said wheel rim.

11. The combination with a vehicle wheel rim having two lugs associated therewith and each extending in a general direction radially inwardly toward the axis of rotation of the wheel rim, each lug having a recess, of a vehicle tire chain unit for quick application to and removal from said rim, said unit including two apertured members each of which may be placed over and impaled on one of said lugs, latch means pivotally mounted on each of said apertured members and having a part arranged to enter the recess of the lug on which the associated apertured member is impaled to resist displacement of said apertured member from said lug, and a plurality of separate cross chains each operatively connected at one end to one of said two apertured members and operatively connected at the other end to the other of said two apertured members and so arranged that when both of said apertured members are impaled on their respective lugs, said cross chains may extend across the tread of a tire mounted on said wheel rim.

12. A vehicle tire chain construction comprising a clamping unit for application to a wheel rim, and a chain unit readily attachable to and detachable from said clamping unit without detaching said clamping unit from said rim, said clamping unit including a laterally extending surface and a lug projecting from said surface in a general direction radially inwardly toward the axis of rotation of the wheel rim, the other of said units including an apertured part to be placed over said lug to connect the two units to each other and latch means movably mounted on said apertured part to cooperate with said projecting lug to resist displacement of said apertured part from said lug.

13. A vehicle tire chain construction comprising a clamping unit for application to a wheel rim, and a chain unit readily attachable to and detachable from said clamping unit without detaching said clamping unit from said rim, said chain unit including a connecting member having a weakened line at one or more points so that said member may be readily broken off at said weakened line to shorten its length.

14. A vehicle tire chain construction comprising a clamping unit for application to a wheel rim, said clamping unit including a lug portion, and a chain unit readily attachable to and detachable from said clamping unit without detaching said clamping unit from said rim, said chain unit including a side bar for detachable connection with said clamping unit, said side bar having a substantially straight portion and an end portion extending for a substantial distance in a direction transversely to said straight portion and having in said straight portion an aperture for receiving said lug portion of said clamping unit and latch means movably mounted on said straight portion for cooperation with said lug portion, a hanger link secured to said end portion of said side bar, said hanger link having a broad flat surface for contact with the tire to avoid chafing thereof, and a cross chain having one end secured to said hangar link, said chain extending across the tread of the tire.

15. A vehicle tire chain construction comprising a clamping unit for application to a wheel rim, and a chain unit readily attachable to and detachable from said clamping unit without detaching said clamping unit from said rim, said clamping unit including a pair of hook members applied to opposite sides of the rim and extending from the outer free edges of the rim inwardly beyond the inner periphery of the rim, each hook member engaging said rim intermediate the ends of the hook member and each having a hook portion embracing the outer free edge of the rim and extending around said free edge and onto the inner surface of the rim far enough to prevent said hook portions on the two hook members from moving laterally outwardly away from each other when force is applied to the inner ends of said two hook members to tend to move the inner ends laterally toward each other, screw threaded means inwardly of said inner periphery of the rim for connecting said two hook members to each other to tend to draw the inner ends thereof toward each other, serrations on said screw threaded means, and corresponding interlocking serrations on at least one of said hook members to resist unscrewing movement of said screw threaded means.

16. As a new article of manufacture, a hook member for application to a vehicle wheel rim to form part of a clamping unit attachable to and detachable from the rim, said hook member comprising a hook shaped portion to embrace a free edge of the rim, said member having a portion extending from said hook shaped portion in a general direction radially inwardly toward the axis of rotation of the wheel to a point spaced laterally from the rim, said member extending from said point in a lateral direction toward the central plane of the wheel into contact with the rim, said member extending thence in a general direction radially inwardly toward said axis of rotation, and a lug on said laterally extending portion projecting therefrom in a general direction toward said axis and spaced laterally from said last mentioned radially extending portion.

17. Self gripping means for anchoring chains upon wheels having rim sections that afford edges to be gripped and transverse ledges to sustain the chains; said means comprising clamping members having approximately radial inner ends provided with means for drawing the clamping members together upon the wheel rim, intermediate transverse seating portions adapted to enter into bearing upon the ledges of the rim, gripping ends radially offset outwardly from said seating portions to points at which they grip the rim, and chain-connecting bars united with the seating portions of the clamping members at points which cause them to deliver stresses of the chain directly to said seating portions and having chain-connecting ends offset laterally outward from said seating portions to cause chain stresses to develop a laterally inward moment thereon tending to produce a moment at the gripping claws laterally toward the rim edges which they engage.

18. A vehicle tire chain unit for quick application to and removal from a wheel rim having a lug associated therewith and extending in a general direction radially inwardly toward the axis of rotation of the wheel rim, said unit comprising an apertured part to be placed over said lug, latch means movably mounted on said apertured part to cooperate with said lug to resist displacement of said apertured part from said lug, and cross chain means operatively connected to said apertured part and adapted to extend across the tread of a tire mounted on said wheel rim.

19. The combination with a vehicle wheel rim having two lugs associated therewith and each extending in a general direction radially inwardly toward the axis of rotation of the wheel rim, of a vehicle tire chain unit for quick application to and removal from said rim, said unit including two apertured members each of which may be placed over and impaled on one of said lugs, latch means movably mounted on each of said apertured members to cooperate with the lug on which it is impaled to resist displacement of said apertured member from said lug, and cross chain means operatively connected to both of said apertured members and arranged so that when both of said members are impaled on their respective lugs, said cross chain means may extend across the tread of a tire mounted on said wheel rim.

PETER J. NAGLE.